United States Patent
Chen et al.

(10) Patent No.: US 10,749,716 B2
(45) Date of Patent: Aug. 18, 2020

(54) SIGNAL PATH LINEARIZER

(71) Applicant: TEXAS INSTRUMENTS INCORPORATED, Dallas, TX (US)

(72) Inventors: Dongwei Chen, Pleasanton, CA (US); Amit Rane, Santa Clara, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/960,532

(22) Filed: Apr. 23, 2018

(65) Prior Publication Data
US 2019/0312759 A1   Oct. 10, 2019

Related U.S. Application Data

(60) Provisional application No. 62/654,753, filed on Apr. 9, 2018.

(51) Int. Cl.
*H04L 25/49* (2006.01)
*H04L 25/03* (2006.01)

(52) U.S. Cl.
CPC ........ *H04L 25/49* (2013.01); *H04L 25/03057* (2013.01)

(58) Field of Classification Search
None
See application file for complete search history.

(56) References Cited

U.S. PATENT DOCUMENTS

| | | | | |
|---|---|---|---|---|
| 4,156,848 A | * | 5/1979 | Stimple | H03G 3/20 329/327 |
| 5,017,885 A | * | 5/1991 | Saleh | H01S 5/0683 359/337 |
| 5,920,810 A | * | 7/1999 | Finol | H03D 7/1433 327/356 |
| 6,466,089 B2 | * | 10/2002 | Tay | H03F 1/56 330/144 |
| 6,711,391 B1 | * | 3/2004 | Walker | H03G 7/08 455/127.3 |

(Continued)

OTHER PUBLICATIONS

Zhang et al. A Tutorial on PAM4 Signaling for 56G Serial Link Applications, Xilinx SerDes Technology Group, Jan. 2016 (Year: 2016).*

(Continued)

*Primary Examiner* — Berhanu Tadese
(74) *Attorney, Agent, or Firm* — John R. Pessetto; Charles A. Brill; Frank D. Cimino

(57) ABSTRACT

A signal path linearizer for PAM4 SerDes communications compensates (including pre-compensates) for signal path nonlinearities. The linearizer can be configured with first and second differential gm stages, the first differential gm stage to provide a DC gain, and the second differential gm stage to introduce a defined nonlinear adjustment in DC gain by adding to or subtracting from the DC gain of the first differential gm stage. The differential gm stages can be configured to generate a compensated PAM4 signal with the combined DC gain providing a nonlinear wideband gain adjustment to compensate for nonlinearities in the PAM4 signal path. Compensation range can be increased by selective degeneration, and the compensation region can be shifted by selectively introducing input offset(s).

19 Claims, 11 Drawing Sheets

(56) References Cited

U.S. PATENT DOCUMENTS

| | | | | |
|---|---|---|---|---|
| 6,788,139 B2* | 9/2004 | Villemazet | H03F 1/3252 | 330/149 |
| 7,345,542 B2* | 3/2008 | Dashtestani | H03F 3/45085 | 330/256 |
| 7,505,541 B1* | 3/2009 | Brunn | H03D 13/003 | 375/360 |
| 7,605,660 B1* | 10/2009 | Kobayashi | H03F 1/083 | 330/254 |
| 7,729,446 B2* | 6/2010 | Copeland | H03F 1/3247 | 330/149 |
| 7,746,172 B1* | 6/2010 | Kobayashi | H03F 1/083 | 330/260 |
| 7,822,146 B2* | 10/2010 | Copeland | H03F 1/3241 | 330/149 |
| 7,852,152 B2* | 12/2010 | Baranauskas | H03F 3/45085 | 330/109 |
| 7,990,185 B2* | 8/2011 | Tran | H03H 15/00 | 327/552 |
| 8,073,074 B2* | 12/2011 | Waheed | H04L 27/368 | 375/297 |
| 8,085,079 B2* | 12/2011 | Tran | H03H 15/00 | 327/361 |
| 8,295,396 B2* | 10/2012 | Waheed | H03G 3/3047 | 375/297 |
| 8,405,455 B2* | 3/2013 | Coupland | H03F 1/3211 | 330/110 |
| 8,466,713 B2* | 6/2013 | Stojanovic | H03L 7/0807 | 327/2 |
| 8,711,974 B2* | 4/2014 | Kumar | H03F 1/3294 | 375/232 |
| 8,937,470 B2* | 1/2015 | Lin | H02M 1/4225 | 323/284 |
| 9,100,232 B1* | 8/2015 | Hormati | H04L 25/0276 | |
| 9,210,008 B2* | 12/2015 | Rane | H04L 25/0286 | |
| 9,331,651 B1* | 5/2016 | Ng | H03G 3/3078 | |
| 9,337,993 B1* | 5/2016 | Lugthart | H04L 7/033 | |
| 9,374,217 B1* | 6/2016 | Forey | H04L 7/0331 | |
| 9,397,623 B1* | 7/2016 | Lacroix | H03F 3/193 | |
| 9,413,524 B1* | 8/2016 | Xu | H04L 7/0087 | |
| 9,473,074 B1* | 10/2016 | Blom | H03F 1/26 | |
| 9,473,330 B1* | 10/2016 | Francese | H04B 1/123 | |
| 9,538,092 B2* | 1/2017 | Mody | H04N 5/345 | |
| 9,602,116 B1* | 3/2017 | Le | H03M 1/0604 | |
| 9,660,730 B1* | 5/2017 | Rope | H04B 10/54 | |
| 9,716,933 B2* | 7/2017 | Oliaei | H04R 1/08 | |
| 9,780,881 B1* | 10/2017 | Rope | H04B 10/0795 | |
| 9,806,915 B1* | 10/2017 | Elzeftawi | H04L 25/03885 | |
| 9,847,839 B2* | 12/2017 | Gopalakrishnan | H04L 25/49 | |
| 9,906,232 B1* | 2/2018 | Cho | H03M 1/007 | |
| 9,935,682 B1* | 4/2018 | Chada | H04L 25/03121 | |
| 9,942,063 B1* | 4/2018 | Mendel | H04L 25/08 | |
| 10,038,575 B1* | 7/2018 | Steffan | H04L 27/01 | |
| 10,200,218 B2* | 2/2019 | Tajalli | H04L 25/03267 | |
| 2002/0057101 A1* | 5/2002 | Tang | H04L 25/03878 | 326/29 |
| 2002/0180547 A1* | 12/2002 | Staszewski | H03F 1/0205 | 332/115 |
| 2006/0152283 A1* | 7/2006 | Dashtestani | H03F 3/45094 | 330/256 |
| 2007/0018707 A1* | 1/2007 | Rajagopal | H03K 5/13 | 327/231 |
| 2007/0211364 A1* | 9/2007 | Dean | H03F 3/45085 | 360/67 |
| 2007/0223630 A1* | 9/2007 | Taylor | H03F 1/3258 | 375/345 |
| 2008/0130789 A1* | 6/2008 | Copeland | H04L 25/03343 | 375/297 |
| 2008/0253594 A1* | 10/2008 | Rasmussen | H04R 25/453 | 381/312 |
| 2009/0279893 A1* | 11/2009 | Tran | H03H 15/00 | 398/79 |
| 2010/0039174 A1* | 2/2010 | Teetzel | H03F 1/3211 | 330/149 |
| 2010/0052778 A1* | 3/2010 | Baranauskas | H03H 11/0433 | 330/109 |
| 2010/0225389 A1* | 9/2010 | Teetzel | H03F 1/3211 | 330/149 |
| 2010/0271107 A1* | 10/2010 | Tran | H03H 15/00 | 327/361 |
| 2011/0228823 A1* | 9/2011 | Lutz | H04B 3/141 | 375/219 |
| 2011/0228824 A1* | 9/2011 | Lutz | H04B 3/141 | 375/219 |
| 2011/0228871 A1* | 9/2011 | Lutz | H04L 25/03343 | 375/295 |
| 2012/0068748 A1* | 3/2012 | Stojanovic | H04L 7/0331 | 327/161 |
| 2012/0155527 A1* | 6/2012 | Gruendler | H04L 25/0274 | 375/226 |
| 2012/0182167 A1* | 7/2012 | Wakimoto | H03F 1/342 | 341/155 |
| 2012/0280749 A1* | 11/2012 | Kumar | H04L 25/03834 | 330/149 |
| 2013/0121047 A1* | 5/2013 | Lin | H02M 1/4225 | 363/84 |
| 2013/0135606 A1* | 5/2013 | Giacotto | G01C 3/08 | 356/5.01 |
| 2013/0241656 A1* | 9/2013 | Tajinna | H03F 1/3247 | 330/295 |
| 2013/0288612 A1* | 10/2013 | Afsahi | H03F 1/0222 | 455/73 |
| 2013/0294546 A1* | 11/2013 | Ennanni-Neyestanak | H03F 1/08 | 375/319 |
| 2014/0355663 A1* | 12/2014 | Kizer | H04L 25/03885 | 375/236 |
| 2015/0109059 A1* | 4/2015 | Afsahi | H03F 3/195 | 330/301 |
| 2015/0340952 A1* | 11/2015 | Manohar | H02M 3/158 | 323/271 |
| 2016/0087747 A1* | 3/2016 | Way | H04B 10/541 | 398/81 |
| 2016/0315712 A1* | 10/2016 | Vassilieva | H04J 14/0201 | |
| 2016/0344358 A1* | 11/2016 | Oliaei | H03G 3/3005 | |
| 2016/0344481 A1* | 11/2016 | Vassilieva | H04B 10/564 | |
| 2016/0363835 A1* | 12/2016 | Nagarajan | G02F 1/0121 | |
| 2017/0126236 A1* | 5/2017 | Gu | H03L 7/085 | |
| 2017/0141871 A1* | 5/2017 | Yang | H04B 10/2914 | |
| 2017/0244448 A1* | 8/2017 | Bennett | H04B 3/54 | |
| 2017/0250840 A1* | 8/2017 | Aleksic | H04L 25/03057 | |
| 2017/0257168 A1* | 9/2017 | Gopalakrishnan | H04L 25/00 | |
| 2017/0272046 A1* | 9/2017 | Pera | H03G 3/30 | |
| 2017/0366375 A1* | 12/2017 | Pham | H04B 10/6971 | |
| 2018/0131443 A1* | 5/2018 | Gopalakrishnan | H04L 25/49 | |
| 2018/0191448 A1* | 7/2018 | Kaneda | H04B 10/69 | |
| 2018/0219519 A1* | 8/2018 | Schober | H03F 3/082 | |
| 2018/0278405 A1* | 9/2018 | Yao | H04L 7/0334 | |
| 2018/0287837 A1* | 10/2018 | Zhang | H04L 27/01 | |
| 2018/0294884 A1* | 10/2018 | Rope | H04B 10/40 | |
| 2019/0312759 A1* | 10/2019 | Chen | H04L 25/49 | |

OTHER PUBLICATIONS

David Maliniak, The foundamental of PAM4, Teledyne LeCroy, Jan. 14, 2016.pdf (Year: 2016).*

Katz A., Advanced Linearizer Information, Linearizer Technology, Inc, Apr. 2002, Retrieved Nov. 2018 (Year: 2018).*

PAM-4: A Key Solution for Next-Generation Short-Haul Optical Fiber Links by Winston Way, Ph.D, May 11, 2015 (Year: 2015).*

\* cited by examiner

SIGNAL PATH LINEARIZER

CROSS-REFERENCE TO RELATED APPLICATIONS

Priority is claimed under 37 CFR 1.78 and 35 USC 119(e) to U.S. Provisional Application 62/654,753, filed 2018 Apr. 9, which is incorporated by reference in its entirety.

BACKGROUND

A pulse amplitude modulation 4-level PAM4 SerDes communications link is based on PAM4 signal encoding with four signal levels that encode 2 bits mapped to one symbol, such as based on Gray coding: 10/11/01/00, or 3201. The PAM4 signal levels are separated by three PAM4 eyes: top, middle, and bottom.

The three PAM4 eyes are not vertically symmetrical (eye height and width) because, with four signal/voltage levels, transitions are required between non-adjacent signal levels, which take longer than transitions between adjacent signal levels. As a result, the top and an bottom eyes are narrowed relative to the middle eye.

Signal path nonlinearities cause significant degradation in the PAM4 signal, as reflected in eye symmetry (eye height/width) and vertical alignment (skew). For an example system with a transmitter TX and receiver RX connected over a PAM4 SerDes com link, signal path nonlinearities in the TX, RX and com link (including TX-end and RX-end signal interfaces) degrade the PAM4 signal (see, FIG. 3A), as reflected in degrading vertical eye symmetry and vertical eye alignment.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for signal path linearization for PAM4 signals, such as can be used in system based on PAM4 serial communications, including a PAM4 SerDes (serializer/deserializer) communications link.

According to aspects of the Disclosure, a methodology for PAM4 signal path linearization includes: (a) receiving a PAM 4 signal over the PAM4 signal path; (b) providing a first DC (direct current) gain to the PAM4 signal with a first differential gm stage, configured to provide a DC (direct current) gain; and (c) providing a second DC gain with a second differential gm stage configured to introduce a defined nonlinear adjustment in DC gain by adding to or subtracting from the DC gain of the first differential gm stage. The methodology can include generating a compensated PAM4 signal with the combined DC gain from the first and second differential gm stages providing a nonlinear wideband gain adjustment to compensate for nonlinearities in the PAM4 signal path.

According to other aspects of the Disclosure, a PAM4 signal path linearizer can be configured with at least first and second differential gm stages, coupled in cascade between an input port and an output port. The first differential gm stage is coupled to the differential input port, and configured to provide a DC (direct current) gain. The second differential gm stage is coupled to an output of the first differential gm stage, and configured to introduce a defined nonlinear adjustment in DC gain by adding to or subtracting from the DC gain of the first differential gm stage. The at least first and second differential gm stages can be configured to generate a compensated PAM4 signal with the combined DC gain from the first and second differential gm stages providing a nonlinear wideband gain adjustment to compensate for nonlinearities in the PAM4 signal path. Compensation range can be increased by selective degeneration, and the compensation region can be shifted by selectively introducing input offset(s).

According to other aspects of the Disclosure, a PAM4 communications system includes a PAM4 SerDes (serializer/deserializer) communications link (PAM4 link), a transmitter (TX) interfaced to a first end of the PAM4 Link, and a receiver (RX) interfaced to a second end of the PAM4 link, the TX, RX and PAM4 link comprising a PAM4 signal path. The PAM4 communications system includes at least first and second differential gm stages, coupled in cascade between the input port and the output port, the first differential gm stage coupled to the differential input port, and configured to provide a DC (direct current) gain, and the second differential gm stage coupled to an output of the first differential gm stage, and configured to introduce a defined nonlinear adjustment in DC gain by adding to or subtracting from the DC gain of the first differential gm stage. The at least first and second differential gm stages configured to generate a compensated PAM4 signal at the differential output port, with the combined DC gain from the first and second differential gm stages providing a nonlinear wideband gain adjustment to compensate for nonlinearities in the PAM4 signal path. The at least first and second differential gm stages can be configured to introduce the nonlinear DC gain adjustment to approximate an inverse of PAM4 signal path nonlinearities to compensate for nonlinearity at a signal bandwidth for the PAM4 signal.

Other aspects and features of the invention claimed in this Patent Document will be apparent to those skilled in the art from the following Disclosure.

BRIEF DESCRIPTION OF THE DRAWINGS

FIG. 4A illustrates an example schematic with cascaded differential gm stages DIFF1 410 and DIFF2 420 configured to reduce gain in the region of the middle eye, with FIG. 4B providing an equivalent piecewise functional circuit representation of [DIFF1-DIFF2], and with FIG. 4C illustrating example DIFF1/DIFF2 piecewise transfer functions, including piecewise decrease in current gain (DIFF2) to compress the middle eye 402M, and with FIG. 4D providing example plots illustrating the effect of nonlinear gain compensation provided by DIFF1/DIFF2 in the middle eye region 402M.

FIG. 5A illustrates an example schematic with cascaded differential gm stages DIFF1 510 and DIFF2 520 configured to introduce piecewise nonlinear (offset-shifted) DC gain adjustment to increase gain in the region of the bottom eye, with FIG. 5B providing an equivalent piecewise functional circuit representation of [DIFF1+(DIFF2+Vos)], and with FIG. 5C illustrating example DIFF1/DIFF2 piecewise transfer functions, including piecewise increase in (offset-shifted) current gain [DIFF2+Vos] to expand the bottom eye, and with FIG. 5D providing example plots illustrating the effect of nonlinear gain compensation provided by DIFF1/DIFF2 in the bottom eye region 502B.

FIG. 6A illustrates an example schematic with cascaded differential gm stages DIFF1 610, DIFF2 620, and DIFF3 630 configured to introduce piecewise nonlinear (offset-shifted) DC gain adjustment to increase gain in the regions of the top and bottom eyes, with FIG. 6B providing an equivalent piecewise functional circuit representation of offset-shifted nonlinear gain compensation for the top eye [DIFF1+(DIFF2+Vos)], and the bottom eye [DIFF1+(DIFF3−Vos)], and with FIG. 6C illustrating example DIFF1/DIFF2/DIFF3 piecewise transfer functions, including piecewise increase in current gain to expand the top and bottom eyes (602T and 602B), and with FIG. 6D providing example plots illustrating (offset-shifted) nonlinear gain compensation provided by DIFF1/DIFF2/DIFF3 in the top and bottom eye regions (602T and 602B).

DETAILED DESCRIPTION

This Description and the Drawings constitute a Disclosure for a signal path linearizer to compensate for signal path nonlinearities, based on cascaded differential gm stages to introduce nonlinear DC gain adjustment (piecewise), approximating the inverse of signal path nonlinearities, to provide wideband compensation for nonlinearity at signal bandwidth (large signal bandwidth reduction), by reducing AC gain difference between PAM4 signal levels (between PAM4 top/bottom and middle eyes), and illustrating various technical features and advantages.

This Disclosure uses the following nomenclature. A "signal path linearizer" and "signal path linearization" mean, in the context of a PAM4 serial communications link, compensating (including pre-compensating) for nonlinearities in the entire signal path, such as transmit (TX) and receive (RX), interfaced over a PAM4 SerDes (serializer deserializer) communications link.

In brief overview, in example embodiments, a signal path linearizer for PAM4 SerDes communications to compensate (including pre-compensate) for signal path nonlinearities. The signal path linearizer can include at least first and second differential gm stages, coupled in cascade, the second gm stage configured to introduce a defined adjustment in combined DC gain by adding to or subtracting from the DC gain of the first gm stage. Compensation range can be increased by selective degeneration, and the compensation region can be shifted by selectively introducing input offset (s). The first and second differential gm stages can be configured to introduce a combined DC gain to provide nonlinear wideband gain adjustment to compensate for PAM4 signal path nonlinearities, for example, by introducing nonlinear DC gain adjustment to approximate an inverse of the signal path nonlinearities at signal bandwidth, reducing AC gain difference between PAM4 signal levels (between PAM4 top/bottom and middle eyes). In effect, the signal path linearizer introduces piecewise nonlinear DC gain adjustment to selectively distort DC gain to provide wideband linearization to compensate for large signal bandwidth reduction caused by nonlinearities at signal bandwidth.

Figure 1A:
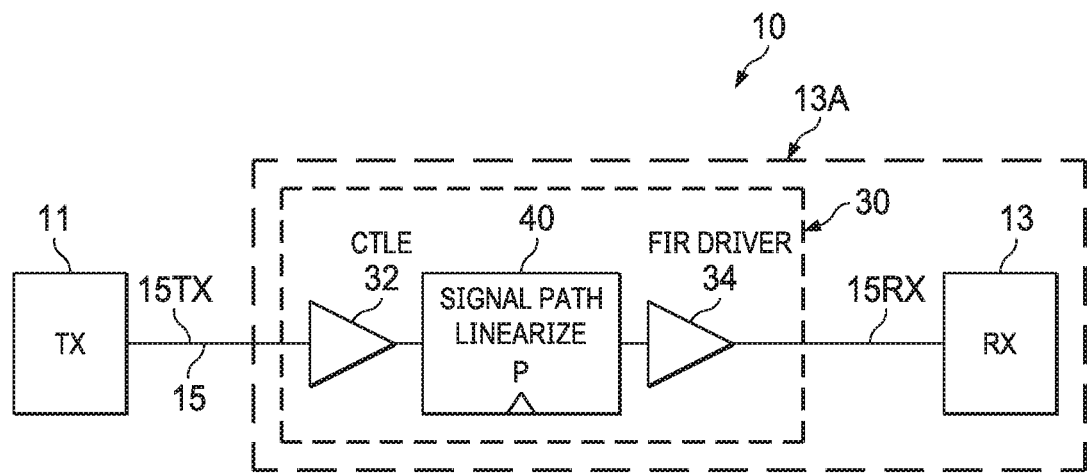
FIGS. 1A and 1B illustrate an example communications system 10 with a transmitter 11 and receiver 13, 13A, and an example PAM4 SerDes com link 15, and including an example repeater 30 that incorporates an example signal path linearizer 40 according to the Disclosure, with FIG. 1B providing example plots illustrating the effect of introducing into the signal path a signal path linearizer according to the Disclosure.
Figure 1B:
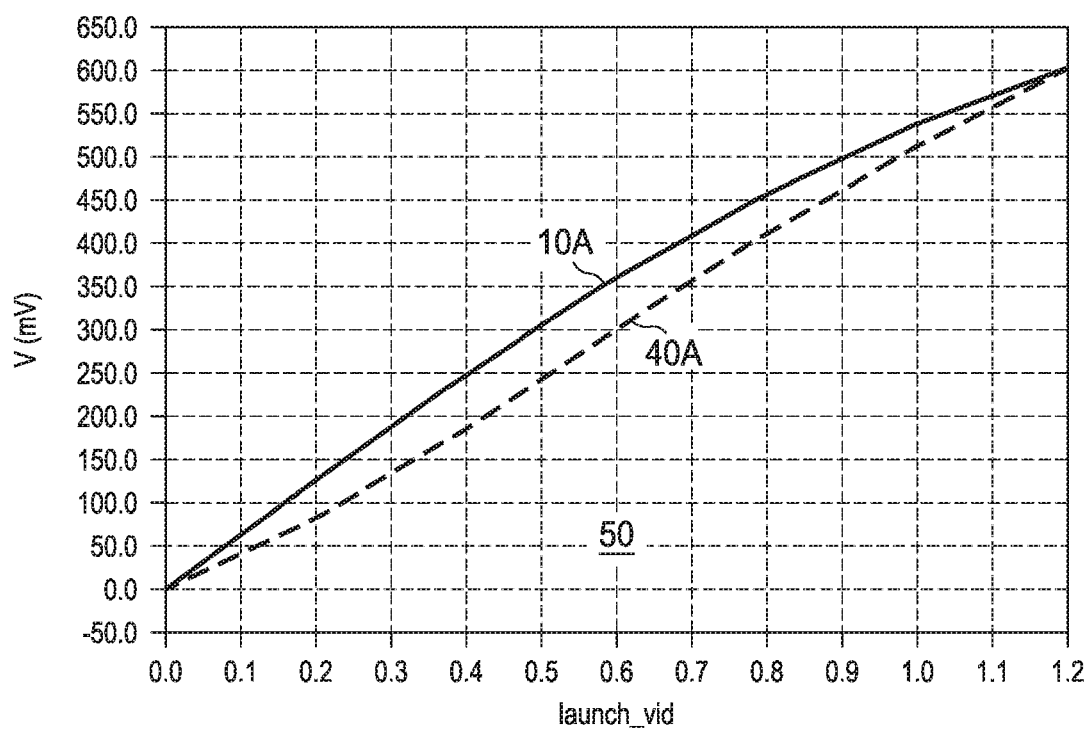

FIGS. 1A and 1B illustrate an example communications system 10. In this illustrative example a transmitter TX IC 11 (such as an application specific integrated circuit or ASIC), and a receiver RX IC 13, 13A, and an example PAM4 SerDes com link 15. The SerDes com link includes a TX end 15TX and a receive end 15RX.

Communication system 10 illustratively includes a repeater 30. SerDes com links can include repeaters at TX end 15TX and/or RX end 15RX, for example to extend link range beyond normal TX-to-RX capability. Alternatively, the repeater functionality can be integrated with RX 13 as a single RX IC 13A with a front-end linearizer interface to the RX signal path circuitry.

As illustrated, repeater 30 includes an analog CTLE (continuous time linear equalizer) 32, and a linear (such as FIR) driver 34, driving linearized PAM4 data signals to the RX 13.

Repeater 30 includes an example signal path linearizer 40 according to the Disclosure. Signal path linearizer can be configured to provide compensation (including pre-compensation) for signal path nonlinearities across the signal chain, TX-to-RX over the PAM4 SerDes com link 15 (including TX and RX SerDes interfaces in the TX and RX.

FIG. 1B provides example plots illustrating the effect of introducing into the signal path a signal path linearizer to improve PAM4 signaling linearity according to the Disclosure. For an example TX-to-RX PAM4 SerDes system, PAM4 signal linearity is illustrated at 10A for a system without signal path linearization, and at 40A for a system that includes in the signal path a signal path linearizer, such as in the example repeater 30 of FIG. 1A. According to the Disclosure, signal path linearization compensates for signal path nonlinearities that produce nonlinearity at signal bandwidth (large signal bandwidth reduction) 10A by introducing nonlinear DC gain adjustment that approximates the inverse of signal path nonlinearities 40A.

Figure 2A:
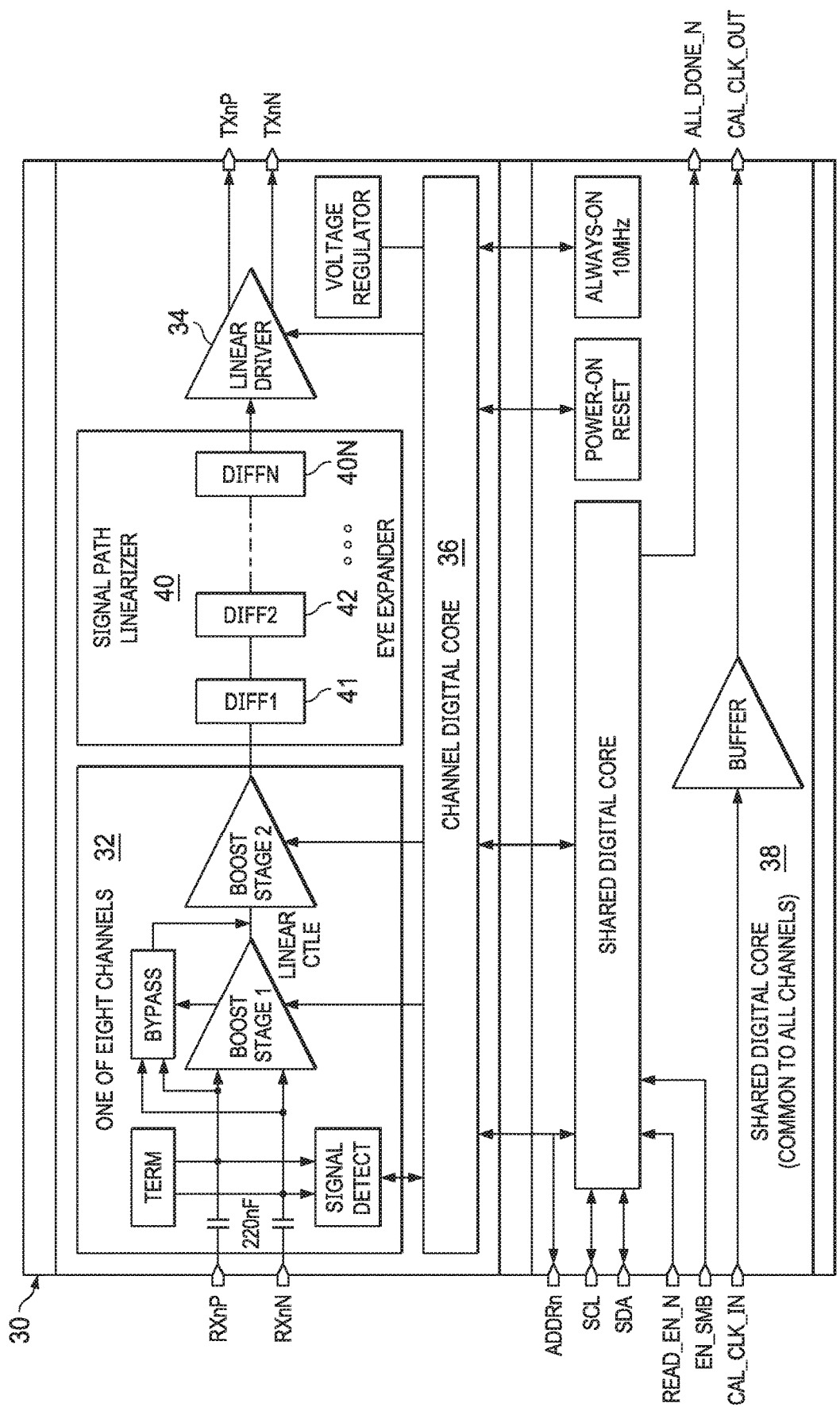
FIGS. 2A and 2B illustrate an example PAM4 repeater 30, including continuous time linear equalizer CTLE 32 and linear driver 34, and including an example signal path linearizer 40 with N cascaded differential gm stages (DIFF1 41, DIFF2 42, . . . DIFFN 40N) each configured to provide, within the signal frequency band, nonlinear gain compensation to compensate for large signal bandwidth reduction from signal path nonlinearities (nonlinearity at signal bandwidth) according to the Disclosure, for example, to compress the middle eye and/or expand the bottom and top eyes (and reduce skew).
Figure 2B:
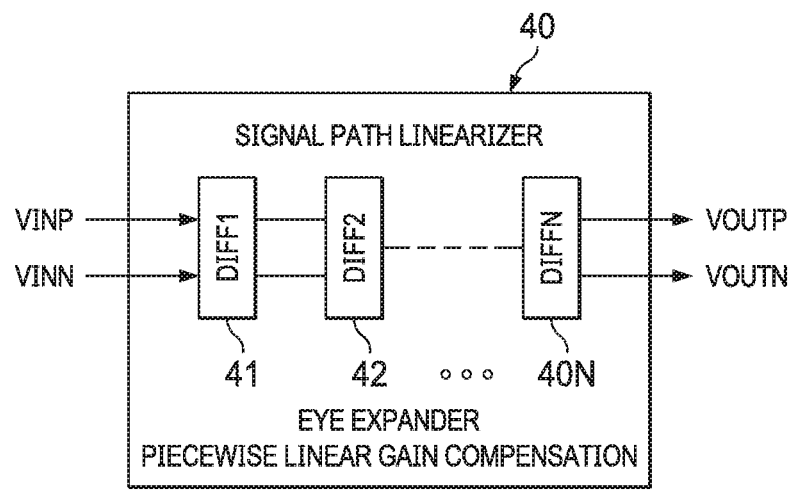

FIGS. 2A and 2B illustrate an example PAM4 repeater 30. Referring to FIG. 2A, repeater 30 includes CTLE 32 and linear driver 34. Repeater 30 incorporates into the signal path a signal path linearizer 40 according to the Disclosure.

The PAM4 repeater 30 receives PAM4 data signals through a PAM4 serial interface RXnP/RXnN, and retransmits the PAM4 data signals through a PAM4 serial interface TXnP/TXnN. The example repeater 40 performs CTLE linearization, and signal path linearization according to the Disclosure, to compensate (including pre-compensate) for nonlinearities in the signal path.

Referring also to FIG. 2B, the example signal path linearizer 40 includes N (N≥2) cascaded differential gm stages (DIFF1 41, DIFF2 42, . . . DIFFN 40N). Each of the differential gm stages is configured to introduce nonlinear DC gain adjustment (piecewise), approximating the inverse of signal path nonlinearities to compensate for nonlinearity at signal bandwidth (large signal bandwidth reduction), including the selective use of degeneration in the tail section of a differential gm stage (compensation range), and offset at the input to a differential gm stage (compensation region).

The combined effect of the nonlinear DC gain adjustment, and (selective) offset adjustment, provided by the cascaded DIFF1-DIFFN gm stages is to compensate for signal path nonlinearities by reducing AC gain difference between PAM4 signal according to the Disclosure. For example, the signal path linearizer can be configured to compress the middle eye and/or expand the bottom and top eyes (approximating the inverse of signal path nonlinearities), to compensate for nonlinearity at signal bandwidth (large signal bandwidth reduction).

Figure 3A:
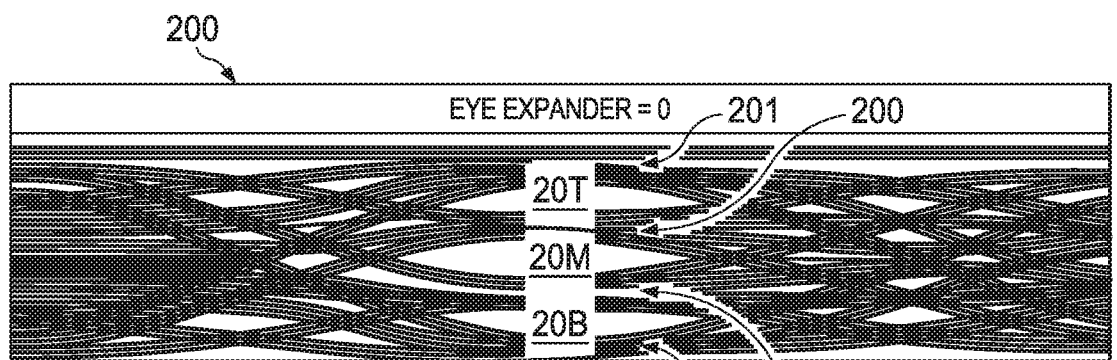
FIGS. 3A-3D are example PAM4 eye diagrams illustrating the effect of signal path nonlinearities, and signal path linearization according to the Disclosure, based on introducing selective gain compensation for signal path nonlinearities, for example, to reduce the AC gain difference between the top/bottom eyes 20T, 20B, and the middle eye 20M.

FIGS. 3A-3D are example PAM4 eye diagram with top, middle and bottom eyes 20T, 20M, and 20B, separating PAM signaling levels 201, 200, 210, 211 corresponding to a Gray code mapping 01, 00, 10, 11 (3201). FIG. 3A illustrates an example PAM signal 200 without signal path linearization illustrating the effect of signal path nonlinearities: the middle eye is nonsymmetrical as to eye height and alignment (skew) with respect to the top and bottom eyes 20T and 20B.

Figure 3B:
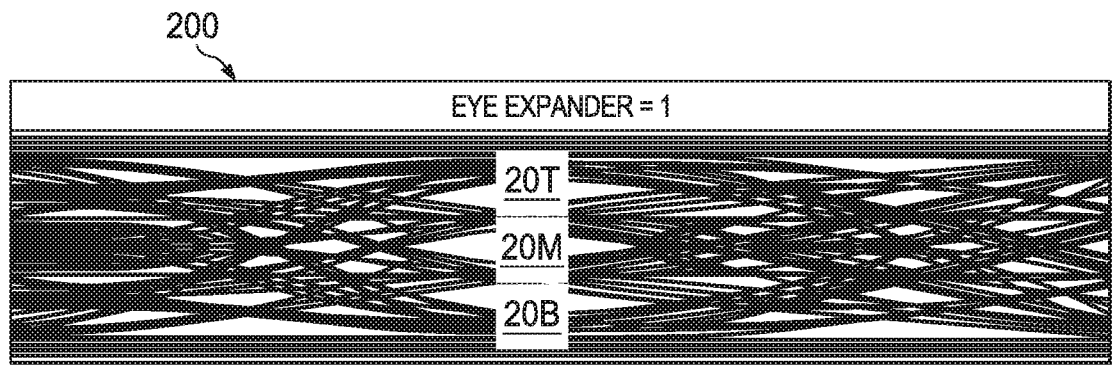
Figure 3C:
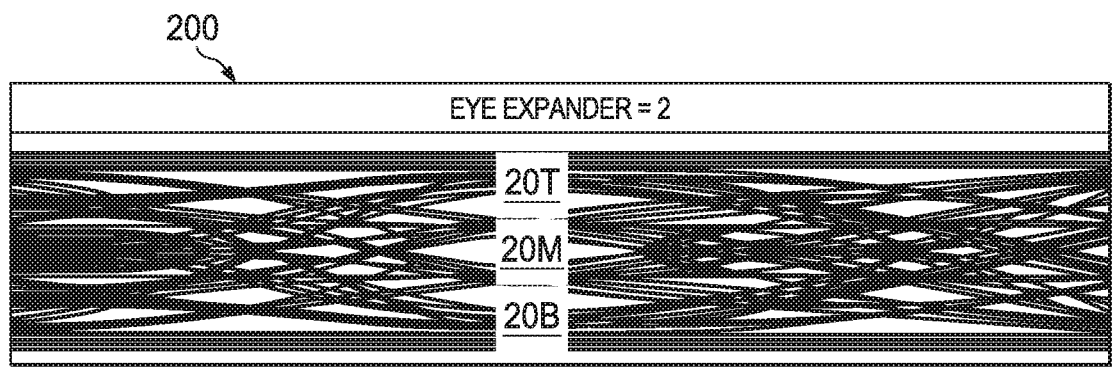
Figure 3D:
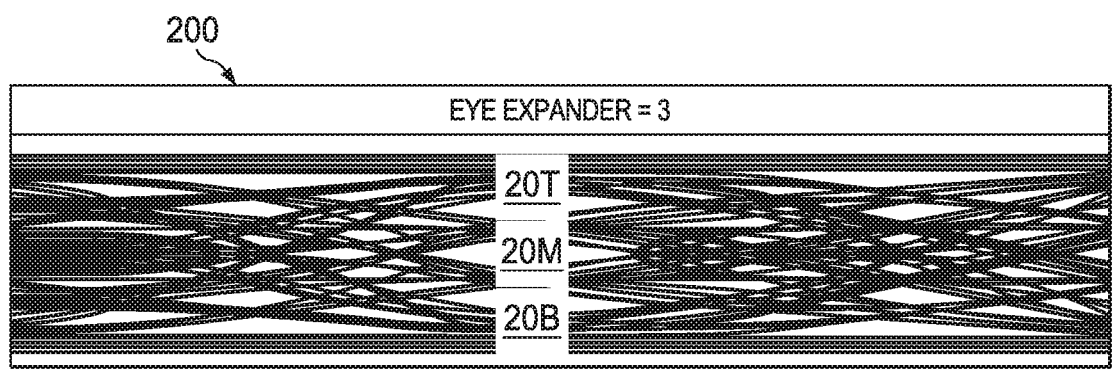

FIGS. 3B-3D illustrate three successive levels of signal path linearization according to the Disclosure, based on introducing selective gain compensation to reduce the AC gain difference between the top/bottom eyes 20T, 20B, and the middle eye 20M. Referring to FIG. 3D, by level the third level of gain compensation, the PAM4 signal 200 is significantly improved as to vertical symmetry and alignment.

Figure 4A:
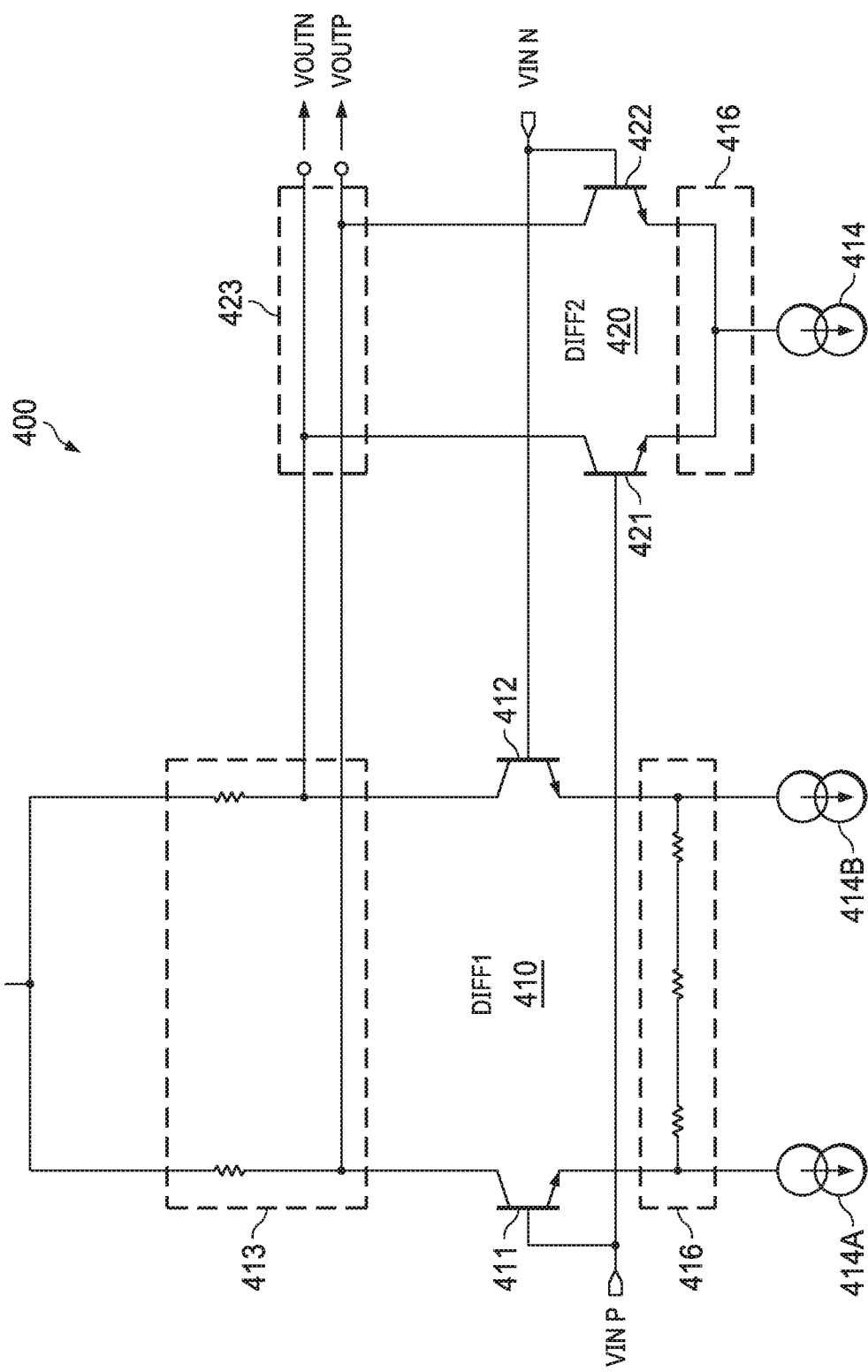
FIGS. 4A, 5A, 6A illustrate design examples for signal path linearization to provide wideband compensation for signal path nonlinearities, according to the Disclosure, based on cascaded differential gm stages configured to provide selective nonlinear gain compensation within the signal frequency band, introducing piecewise nonlinear DC gain adjustment to compensate for nonlinearity at signal bandwidth (large signal bandwidth reduction), by reducing AC gain difference between the PAM4 signal levels, (between the PAM4 top/bottom and middle eyes), for example, by compressing the middle eye, and/or expanding the top and/or bottom eyes.
Figure 5A:
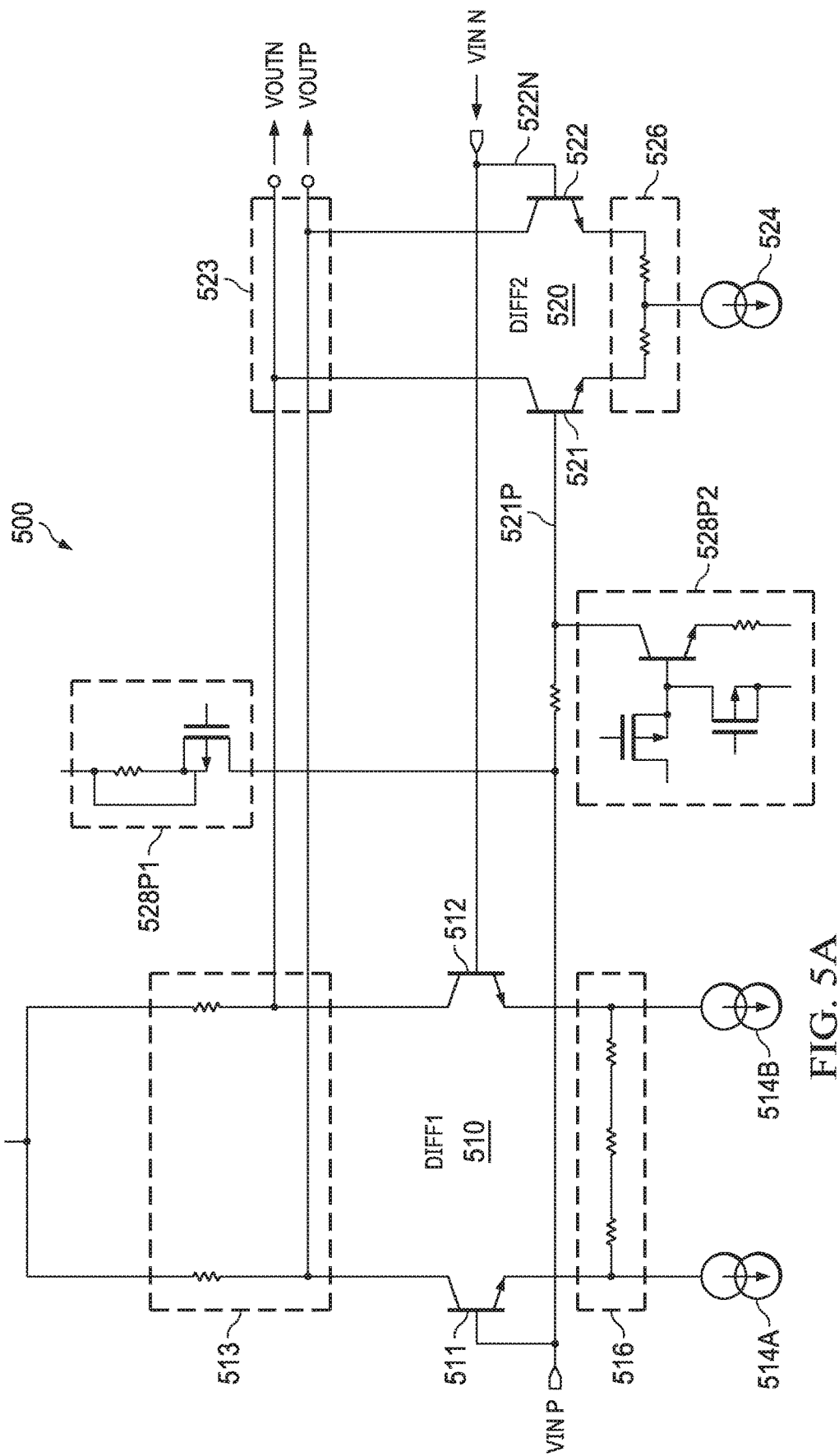
Figure 6A:
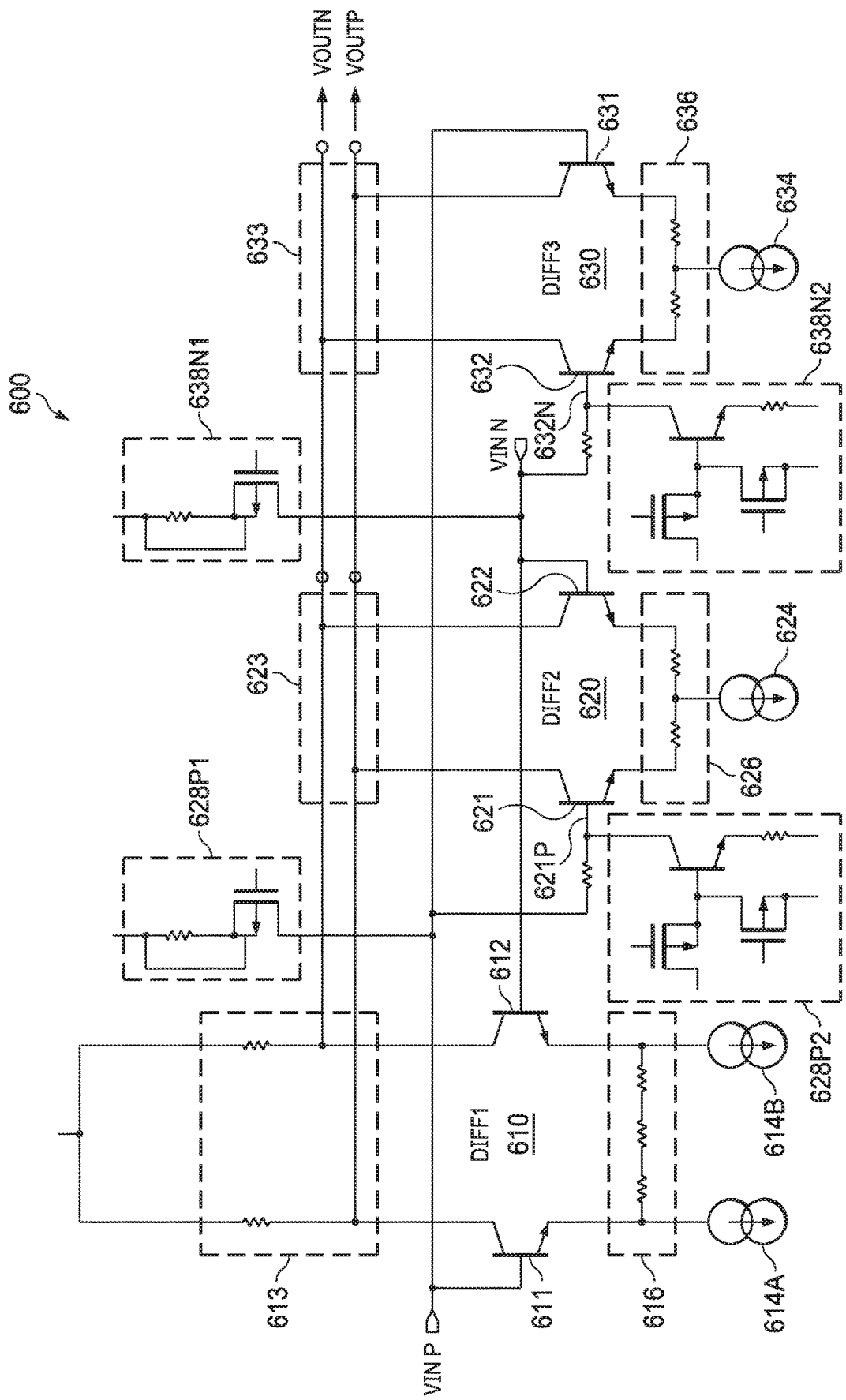

FIGS. 4A, 5A, 6A illustrate design examples for signal path linearization to provide wideband compensation for signal path nonlinearities, according to the Disclosure. These design examples illustrate the configuration of a signal path linearizer (400, 500, 600) based on cascaded differential gm stages configured to provide selective nonlinear gain compensation within the signal frequency band, introducing piecewise nonlinear DC gain adjustment to compensate for nonlinearity at signal bandwidth (large signal bandwidth reduction, by reducing AC gain difference between the PAM4 signal levels, (between the PAM4 top/bottom and middle eyes), for example, by compressing the middle eye, and/or expanding the top and/or bottom eyes. Nonlinear gain compensation can be used to approximate the inverse of signal path nonlinearities. Compensation range can be increased by selective degeneration, and the compensation region can be shifted by selectively introducing input offset(s).

These design examples illustrate the use of selectively-configured differential gm stages to introduce piecewise nonlinear DC gain adjustment to linearize AC gain at signal bandwidth. In effect, the differential gm stages are configured to provide selective DC gain distortion so that the IIP3 curve at signal bandwidth is linearized. For example, the IIP3 curve for an optical application can show compression primarily at the bottom eye, so that a piecewise differential gm stage design can be configured to introduce offset-shifted increased gain to expand the bottom eye (FIGS. 5A-5D). As another example, the IIP3 curve for other applications can show compression at both the top and bottom eyes, so that a piecewise differential gm stage design can be configured to introduce offset-shifted increased gain to expand both the top and bottom eyes (FIGS. 6A-6D).

FIG. 4A illustrates an example design schematic for a signal path linearizer 400, with cascaded differential gm stages DIFF1 410 and DIFF2 420, configured to introduce nonlinear DC gain adjustment (piecewise) to reduce gain in the region of the middle eye to compensate for large signal bandwidth reduction caused by signal path nonlinearity at signal bandwidth.

DIFF1 410 includes a differential n-type-p-type-n-type NPN pair 411/412 receiving differential inputs voltage in positive/voltage in negative VINP/VINN, and providing current gain. DIF1 410 includes collector resistors 413, and emitter tail current sources 414A/414B. DIFF1 provides differential output voltages voltage out positive/voltage out negative VOUTP/VOUTN from the collectors of NPN 411 and NPN 412.

DIFF1 410 is coupled in cascade to DIFF2 420. DIFF2 420 includes a differential NPN pair 421/422, coupled to receive differential inputs VINP/VINN. The DIFF2 differential NPN pair collectors are connected 423 to the outputs VOUTN/VOUTP, and the emitters are coupled to emitter tail current source 424. For the illustrative example, the collector of VINP-controlled NPN 421 is connected to VOUTN from the collector of DIFF1 NPN 412, and the collector of VINN-controlled NPN 422 is connected to VOUTP from the collector of DIFF1 NPN 411, so that the DIFF2 current gain subtracts from the DIFF1 current gain (see, FIGS. 4B/4C).

DIFF1 410 and DIFF2 420 can include emitter degeneration to extend linear operating range, depending on design requirements. For the illustrative example signal path linearizer design 400, DIFF1 410 includes resistor degeneration 416, while DIFF2 420 does not include emitter degeneration, as reflected in the example transfer functions illustrated in FIG. 4C.

Figure 4B:
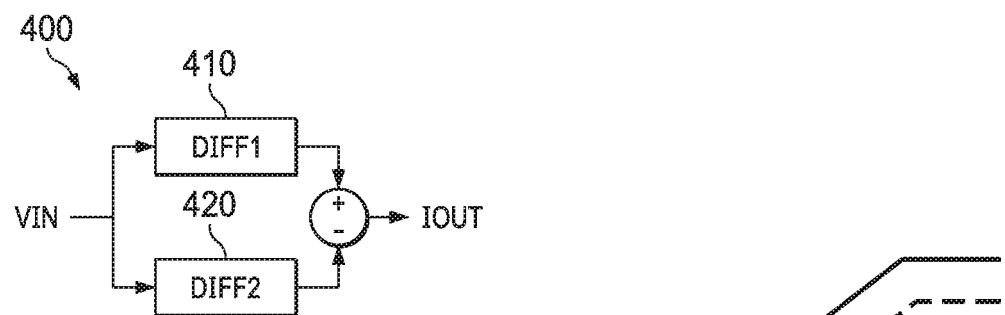

FIG. 4B provides an equivalent piecewise functional circuit representation of the signal path linearizer 400: [DIFF1-DIFF2]=IOUT.

Figure 4C:
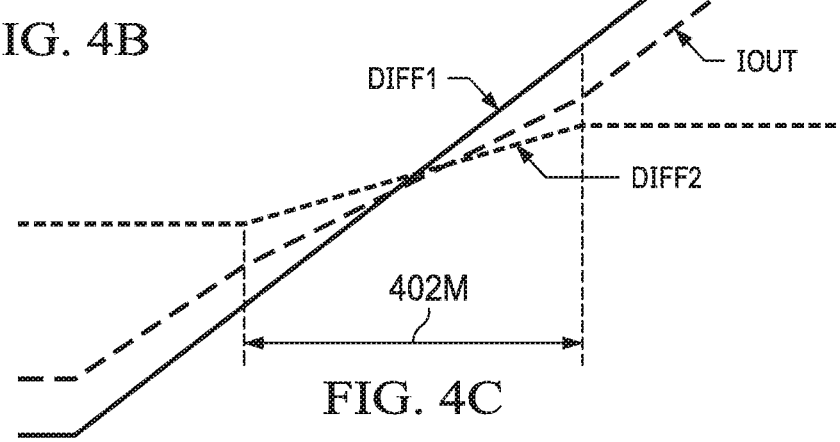

FIG. 4C illustrates example DIFF1/DIFF2 piecewise transfer functions. Within the middle eye region 402M, DIFF 1 and DIFF2 introduce piecewise nonlinear DC gain adjustment, with DIFF2 decreasing the gain of DIFF1, represented by the decrease in current gain IOUT within the middle eye region 402M. Note that the linear range of DIFF1 is extended by degeneration.

Figure 4D:
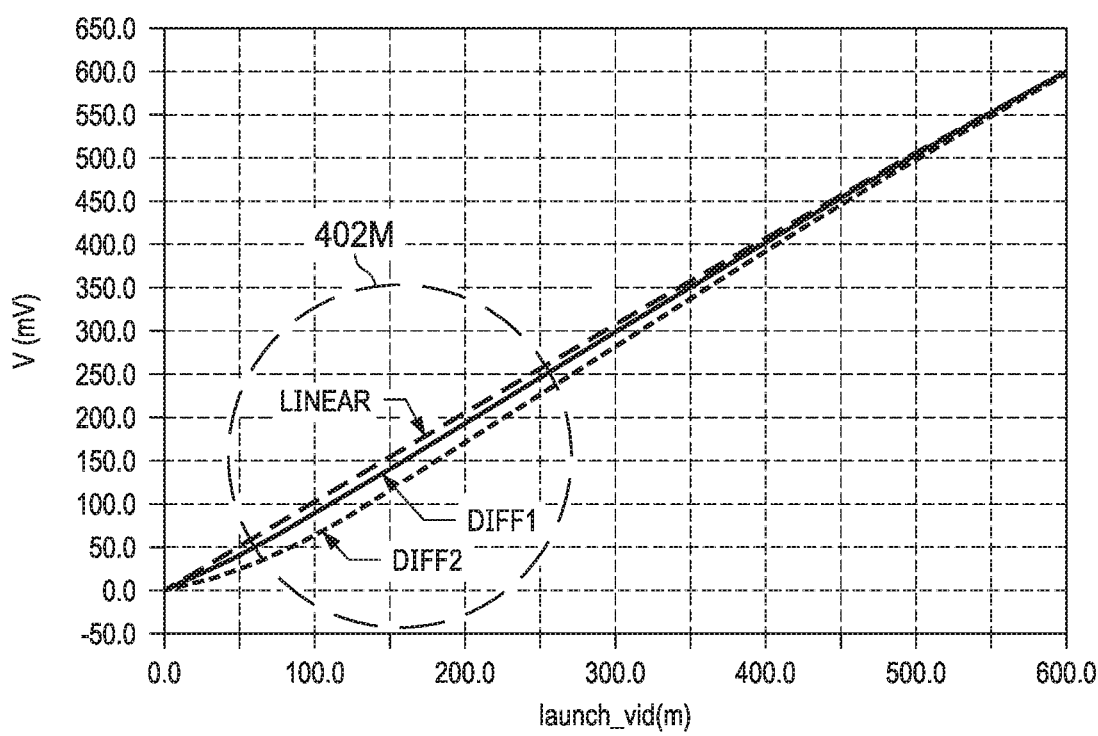

FIG. 4D provides example plots illustrating nonlinear gain compensation provided by DIFF1 and DIFF2 in the middle eye region 402M, to compress the middle eye. DIFF1/DIFF2 provide nonlinear adjustment to DC current gain for small signal (middle eye) compared to large signal gain (top/bottom eyes) to compensate for large signal bandwidth reduction due to nonlinearity at signal bandwidth. This piecewise (DIFF1/DIFF2) nonlinear DC gain adjustment effectively lowers gain for the middle eye at DC to linearize gain at signal bandwidth for the middle and top/bottom eyes.

FIG. 5A illustrates an example design schematic with cascaded differential gm stages DIFF1 510 and DIFF2 520 configured to introduce piecewise nonlinear DC gain adjustment to increase gain in the (offset-shifted) region of the bottom eye.

DIFF1 510 includes a differential NPN pair 511/512 receiving differential inputs VINP/VINN, and providing current gain. DIFF1 includes collector resistors 513, and emitter tail current sources 514A/514B. DIFF1 provides differential output voltages VOUTP/VOUTN from the collectors of NPN 511 and NPN 512.

DIFF1 510 is coupled in cascade to DIFF2 520. DIFF2 520 includes a differential NPN pair 521/522, coupled to receive VINP/VINN. The DIFF2 differential NPN pair collectors are connected 523 to the outputs VOUTN/VOUTP, and the emitters are coupled to emitter tail current source 524. For the illustrative example, the collector of VINP-controlled NPN 521 is connected to VOUTP from the collector of DIFF1 NPN 511, and the collector of VINN-controlled NPN 522 is connected to VOUTN from the collector of DIFF1 NPN 512, so that the DIFF2 current gain adds to the DIFF1 current gain (see, FIGS. 5B/5C).

DIFF1 510 and DIFF2 520 can include emitter degeneration to extend linear operating range, depending on design requirements. For the illustrative example signal path linearizer design 500, DIFF1 510 includes resistor degeneration 516, and DIFF2 520 includes resistor degeneration 526.

For the example signal path linearizer design 500, DIFF2 includes positive-side offset circuits 528P1/528P2 at the VINP input 521P to NPN 521. The DIFF2 offset can be used to shift the compensation region down to the region of the bottom eye (see, FIGS. 5C/5D, 502B).

Figure 5B:
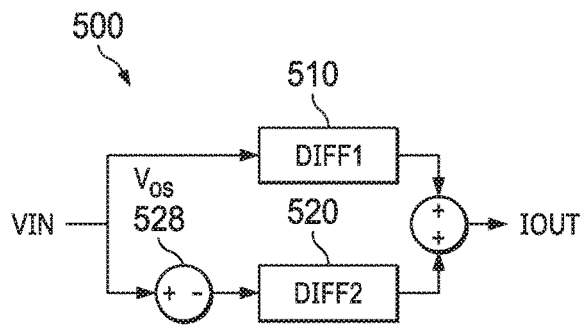

FIG. 5B provides an equivalent piecewise functional circuit representation of the signal path linearizer 400: [DIFF1+(DIFF2+Vos)]=IOUT.

Figure 5C:
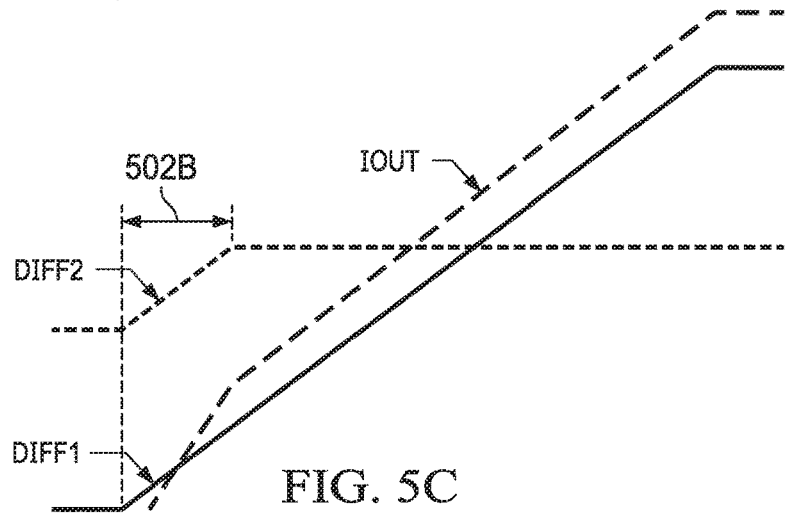

FIG. 5C illustrates example DIFF1/DIFF2 piecewise transfer functions. The DIFF1 linear region is extended by degeneration, and the DIFF2 linear region is offset-shifted to the region of bottom eye 502B. Within the bottom eye region 502B, DIFF 1 and DIFF2 are piecewise linear, with DIFF2 increasing the current gain of DIFF1, represented by the increase in current gain IOUT within the bottom eye region 502B, providing a piecewise increase in offset-shifted DC current gain [DIFF2+Vos] to expand the bottom eye.

Figure 5D:
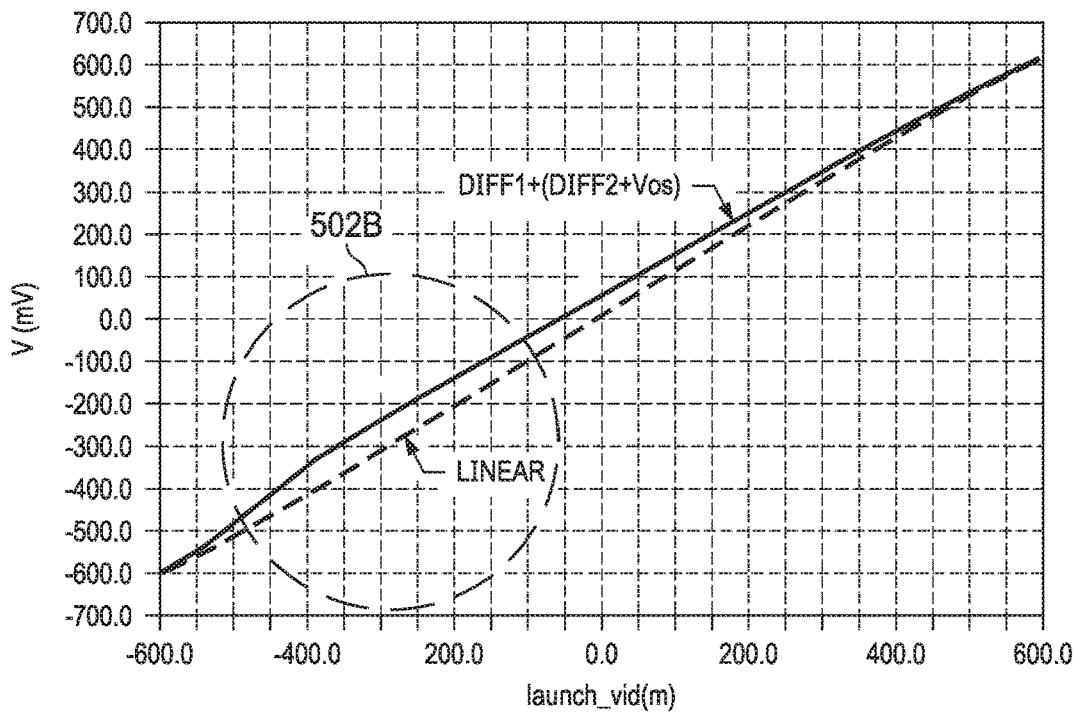

FIG. 5D provides example plots illustrating, in comparison to purely linear gain, nonlinear gain compensation provided by DIFF1/DIFF2 in the bottom eye region 502B, to expand the bottom eye. DIFF1/DIFF2 provide nonlinear adjustment to DC current gain for the bottom eye to compensate for large signal bandwidth reduction due to nonlinearity at signal bandwidth. This piecewise (DIFF1/DIFF2) nonlinear DC gain adjustment effectively increases the gain of the bottom eye compared to the middle eye at DC to linearize gain at signal bandwidth for the bottom and middle eyes.

FIG. 6A illustrates an example schematic with cascaded differential gm stages DIFF1 610, DIFF2 620, and DIFF3 630 configured to introduce piecewise nonlinear DC gain adjustment to increase gain in the offset-shifted regions of the top and bottom eyes.

DIFF1 610 includes a differential NPN pair 611/612 receiving differential inputs VINP/VINN, and providing current gain. DIFF1 includes collector resistors 613, and emitter tail current sources 614A/614B. DIFF1 provides differential output voltages VOUTP/VOUTN from the collectors of VINP-controlled NPN 611 and VINN-controlled NPN 612.

DIFF1 610 is coupled in cascade to DIFF2 620 and DIFF3 630.

DIFF2 620 includes a differential NPN pair 621/622, coupled to receive VINP/VINN. The DIFF2 differential NPN pair collectors are connected 623 to the outputs VOUTN/VOUTP, and the emitters are coupled to emitter tail current source 624. For the illustrative example, the collector of VINP-controlled NPN 621 is connected to VOUTP from the collector of DIFF1 NPN 611, and the collector of VINN-controlled NPN 622 is connected to VOUTN from the collector of DIFF1 NPN 612, so that DIFF2 adds to DIFF1 (with offset shift described below).

DIFF3 630 includes a differential NPN pair 631/632, coupled to receive VINP/VINN. The DIFF2 differential NPN pair collectors are connected 633 to the outputs VOUTN/VOUTP, and the emitters are coupled to emitter tail current source 624. For the illustrative example, the collector of VINP-controlled NPN 631 is connected to VOUTP from the collector of DIFF1 NPN 611, and the collector of VINN-controlled NPN 622 is connected to VOUTN from the collector of DIFF1 NPN 612, so that the DIFF3 current gain adds to the DIFF1 current gain (see, FIGS. 5B/5C) (with offset-shift described below).

DIFF1 610, DIFF2 620 and DIFF3 630 can include emitter degeneration to extend linear operating range, depending on design requirements. For the illustrative example signal path linearizer design 600, DIFF1 610 includes resistor degeneration 616, DIFF2 620 includes resistor degeneration 626, and DIFF3 630 includes resistor degeneration 636.

Figure 6B:
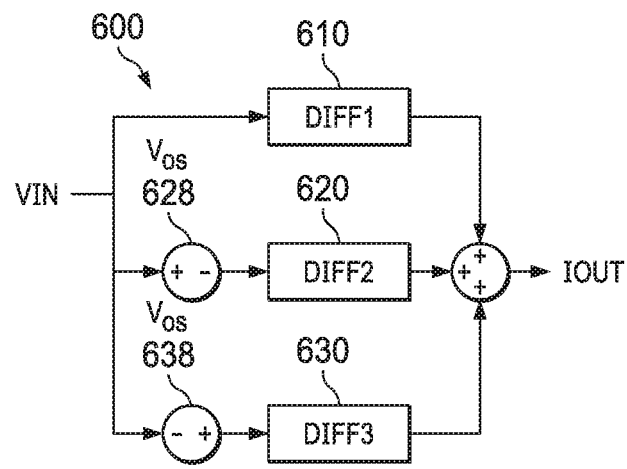
Figure 6C:
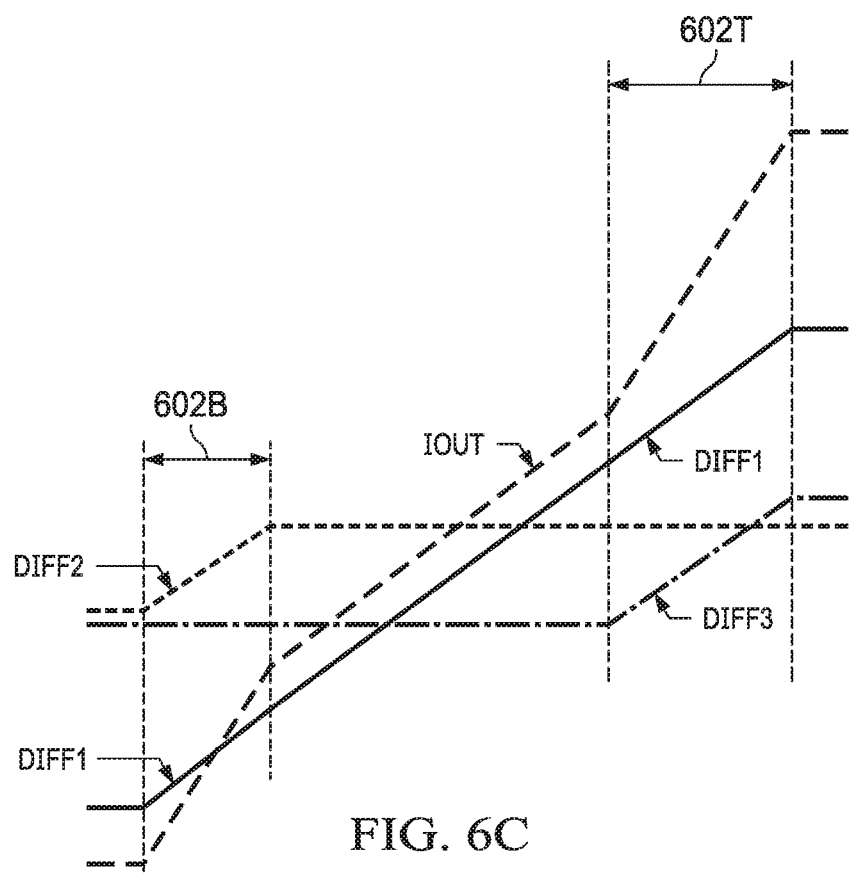

For the example signal path linearizer design 600, DIFF2 620 includes positive-side input offset to shift the compensation region down to the region of the bottom eye, and DIFF3 includes negative-side input offset to shift the compensation region up to the region of the top eye (see, FIGS. 6C/6D, 602B/602T). DIFF2 620 includes offset circuits 628P1/628P2 at the VINP input 621P to NPN 621. DIFF3 630 includes offset circuits 638N1/638N2 at the VINN input 632N to NPN 632. The effect of using offset is described further in connection with FIG. 6C.

FIG. 6B provides an equivalent piecewise functional circuit representation of the signal path linearizer design 400: [DIFF1+(DIFF2+Vos)+(DIFF3−Vos)]=IOUT. That is, for the top eye (FIG. 6C/6D, 602T), nonlinear gain compensation is provided by [DIFF1+(DIFF2+Vos)], and for the bottom eye (FIG. 6C/6D, 602B), nonlinear gain compensation is provided by [DIFF1+(DIFF3−Vos)].

FIG. 6C illustrates example DIFF1/DIFF2/DIFF3 piecewise transfer functions. The DIFF1 linear region is extended by degeneration. The DIFF2 compensation region is offset-shifted down to the region of bottom eye 602B. The DIFF3 compensation region is offset-shifted up to the region of the top eye 602T). Within the bottom eye region 602B, DIFF 1 and DIFF2 are piecewise linear, with DIFF2 increasing the gain of DIFF1, represented by the increase in current gain IOUT within the bottom eye region 602B. Likewise, within the top eye region 602T, DIFF 1 and DIFF3 are piecewise linear, with DIFF3 increasing the gain of DIFF1, represented by the increase in current gain IOUT within the top eye region 602B.

Figure 6D:
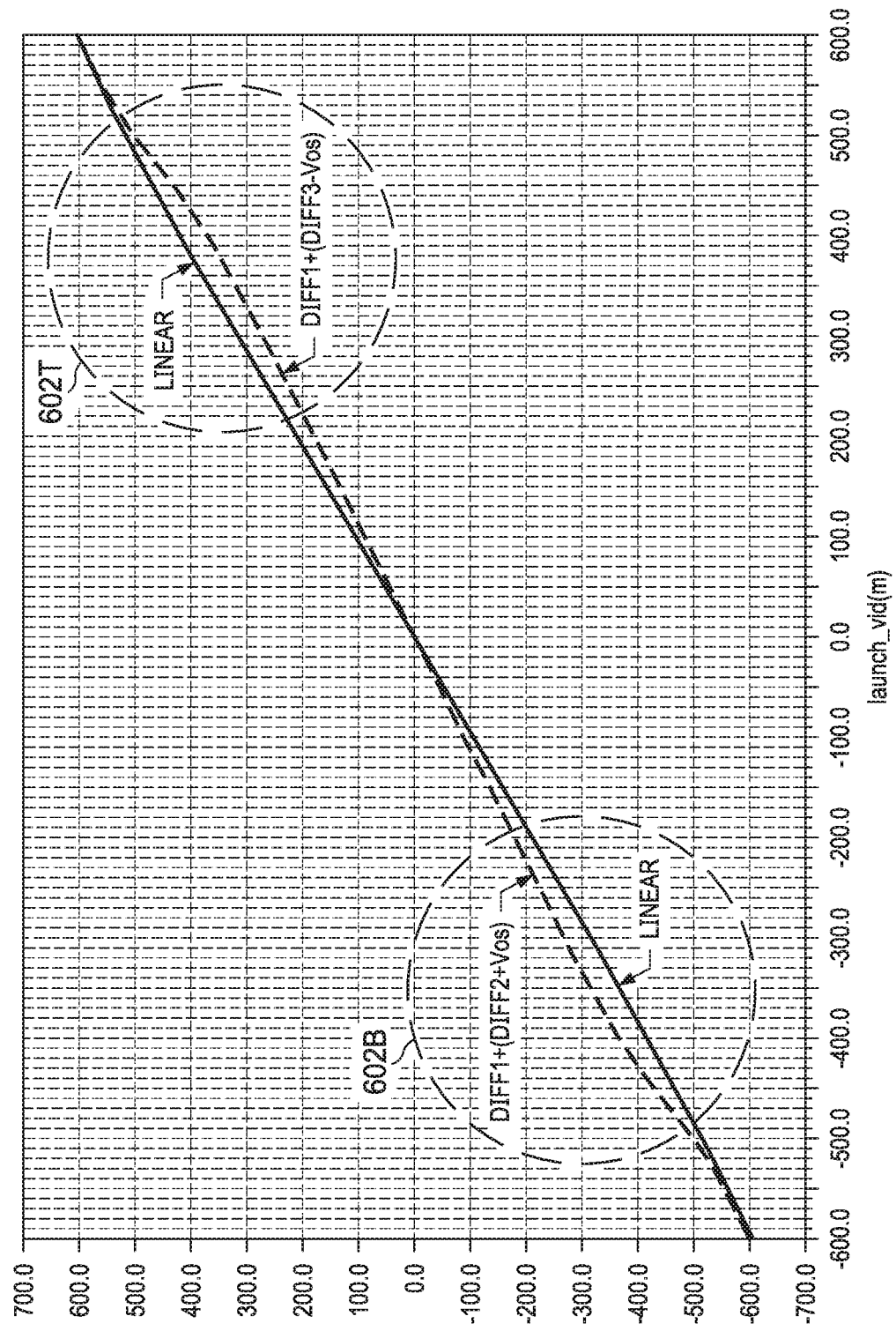

FIG. 6D provides example plots illustrating nonlinear gain compensation provided by the cascaded signal path linearizer DIFF1/DIFF2/DIFF3. In the bottom eye region, DIFF1 and DIFF2 combine to provide piecewise nonlinear DC gain increase in the region of the bottom eye, expanding the bottom eye. In the top eye region, DIFF1 and DIFF3 combine to provide piecewise nonlinear gain increase in the region of the bottom eye, expanding the bottom eye. DIFF1/DIFF2 provide nonlinear adjustment to DC current gain for the bottom eye, and DIFF1/DIFF3 provide nonlinear adjustment to DC current gain for the top eye, to compensate for large signal bandwidth reduction due to nonlinearity at signal bandwidth. This piecewise (DIFF1/DIFF2/DIFF3) nonlinear DC gain adjustment effectively increases the gain of the top and bottom eyes compared to the middle eye at DC to linearize gain at signal bandwidth for the bottom and middle eyes.

The Disclosure provided by this Description and the Figures sets forth example designs and applications illustrating aspects and features of the invention, and does not limit the scope of the invention, which is defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A circuit comprising:
a signal path linearizer included in a pulse amplitude modulation 4-level [PAM4] signal path, the signal path linearizer including:
a differential input port and a differential output port, the differential input port configured for coupling to a PAM4 link for receiving a PAM4 signal, and
at least first and second differential transconductance (gm) stages, coupled in cascade between the differential input port and the differential output port:
each gm stage including a differential pair of transistors coupled between differential output voltage nodes, and a common node, and
at least the second gm stage differential pair selectively including a degeneration element coupled between the differential pair of transistors and the common node;
the first differential gm stage coupled to the differential input port, and configured to provide a DC (direct current) gain;
the second differential gm stage coupled to an output of the first differential gm stage, and configured to introduce a defined nonlinear adjustment in DC gain by adding to or subtracting from the DC gain of the first differential gm stage.

2. The circuit of claim 1, wherein:
the at least first and second differential gm stages configured to generate a compensated PAM4 signal at the differential output port, with the combined DC gain from the first and second differential gm stages providing a nonlinear wideband gain adjustment to compensate for nonlinearities in the PAM4 signal path.

3. The circuit of claim 1, wherein:
the at least first and second differential gm stages are configured to introduce the nonlinear DC gain adjustment to approximate an inverse of PAM4 signal path nonlinearities to compensate for nonlinearity at a signal bandwidth for the PAM4 signal.

4. The circuit of claim 1, wherein the at least first and second differential gm stages each comprises a differential pair of transistors coupled between differential output voltage nodes, and a common node, and:
at least one of the first and second differential gm stages includes an input offset element coupled to an input to at least one of the respective differential pair of transistors.

5. The circuit of claim 1, wherein:
the nonlinear DC gain adjustment includes at least one of compressing the PAM4 middle eye, or expanding at least one of the PAM4 top and bottom eyes.

6. The circuit of claim 1, wherein:
the nonlinear DC gain adjustment includes pre-compensation for nonlinearities in the PAM4 signal path.

7. The circuit of claim 1, wherein:
the PAM4 signal path includes a repeater with the signal path linearizer integrated into the repeater.

8. A system circuit for data communication over a a pulse amplitude modulation 4-level [PAM4] communications link, comprising: a PAM4 SerDes (serializer/deserializer) communications link (PAM4 link);
a transmitter (TX) interfaced to a first end of the PAM4 Link; and
a receiver (RX) interfaced to a second end of the PAM4 Link;
the TX, RX and PAM4 link comprising a PAM4 signal path;
a signal path linearizer included in the PAM4 signal path, the signal path linearizer including:
a differential input port and a differential output port, the differential input port configured for coupling to the PAM4 link for receiving the PAM4 signal, and at least first and second differential transconductance (gm) stages, coupled in cascade between the differential input port and the differential output port:
each differential gm stage including a differential pair of transistors coupled between differential output voltage nodes, and a common node, and
at least the second gm stage differential pair selectively including a degeneration element coupled between the differential pair of transistors and the common node;
the first differential gm stage coupled to the differential input port, and configured to provide a DC (direct current) gain, and
the second differential gm stage coupled to an output of the first differential gm stage, and configured to introduce a defined nonlinear adjustment in DC gain by adding to or subtracting from the DC gain of the first differential gm stage,
the at least first and second differential gm stages configured to generate a compensated PAM4 signal at the differential output port, with the combined DC gain from the first and second differential gm stages providing a nonlinear wideband gain adjustment to compensate for nonlinearities in the PAM4 signal path.

9. The system of claim 8, wherein:
the at least first and second differential gm stages are configured to introduce the nonlinear DC gain adjustment to approximate an inverse of PAM4 signal path nonlinearities to compensate for nonlinearity at a signal bandwidth for the PAM4 signal.

10. The system of claim 8, wherein the at least first and second differential gm stages each comprises a differential pair of transistors coupled between differential output voltage nodes, and a common node, and:
at least one of the first and second differential gm stages includes an input offset element coupled to an input to at least one of the respective differential pair of transistors.

11. The system of claim 8, wherein:
the nonlinear DC gain adjustment includes at least one of compressing the PAM4 middle eye, or expanding at least one of the PAM4 top and bottom eyes.

12. The system of claim 8, wherein:
the nonlinear DC gain adjustment includes pre-compensation for nonlinearities in the PAM4 signal path.

13. The system of claim 8, wherein:
the PAM4 signal path includes a repeater with the signal path linearizer integrated into the repeater.

14. A method for use in a system with a transmitter (TX) and a receiver (RX) interfaced over a a pulse amplitude modulation 4-level [PAM4] SerDes (serializer/deserializer) communications link (PAM4 link), together a PAM4 signal path, the method comprising:
receiving a PAM 4 signal over the PAM4 signal path;
providing a first DC (direct current) gain to the PAM4 signal with a first differential gm stage, configured to provide a DC (direct current) gain, the first differential gm stage including a differential pair of transistors coupled between differential output voltage nodes, and a common node;
providing a second DC gain with a second differential transconductance (gm) stage configured to introduce a defined nonlinear adjustment in DC gain by adding to or subtracting from the DC gain of the first differential gm stage, the second differential gm stage including a differential pair of transistors coupled between differential output voltage nodes, and a common node; and
for at least the second differential gm stage, selectively including a degeneration element coupled between the respective differential pair of transistors and the common node.

15. The method of claim 14, further comprising:
generating a compensated PAM4 signal with the combined DC gain from the first and second differential gm stages providing a nonlinear wideband gain adjustment to compensate for nonlinearities in the PAM4 signal path.

16. The method of claim 15, wherein:
the first and second DC gains introduce a nonlinear DC gain adjustment to approximate an inverse of PAM4 signal path nonlinearities to compensate for nonlinearity at a signal bandwidth for the PAM4 signal.

17. The method of claim 15, further comprising:
for at least the second differential gm stage, selectively providing an input offset to shift a compensation region.

18. The method of claim 15, wherein:
the nonlinear DC gain adjustment includes at least one of compressing the PAM4 middle eye, or expanding at least one of the PAM4 top and bottom eyes.

19. The method of claim 14, wherein:
the nonlinear DC gain adjustment includes pre-compensation for nonlinearities in the PAM4 signal path.

* * * * *